United States Patent [19]

Iobst

[11] Patent Number: 5,101,371
[45] Date of Patent: Mar. 31, 1992

[54] APPARATUS FOR PERFORMING A BIT SERIAL ORTHOGONAL TRANSFORMATION INSTRUCTION

[75] Inventor: Kenneth Iobst, Silver Spring, Md.

[73] Assignee: The United States of America as represented by National Security Agency, Washington, D.C.

[21] Appl. No.: 533,238

[22] Filed: Jun. 4, 1990

[51] Int. Cl.$^5$ ............................................. G06F 7/38
[52] U.S. Cl. ................................. 364/736; 364/715.01
[58] Field of Search ............ 364/736, 725, 716, 715.01, 364/730, 715.02

[56] References Cited

U.S. PATENT DOCUMENTS

| | | |
|---|---|---|
| 3,936,806 | 2/1976 | Batcher . |
| 4,314,349 | 2/1982 | Batcher ............................ 364/716 |
| 4,727,474 | 2/1988 | Batcher ............................ 364/200 |

*Primary Examiner*—Tan V. Mai

[57] ABSTRACT

Apparatus for performing a bit serial orthogonal transformation instruction (BSOTI) is characterized by a unique circuit of bit inputs from two vector registers, a plurality of switching devices, and OR gates for performing transformation. The apparatus enables vector machines to operate on individual bits of words as quickly as it operates on the words stored in memory. Vector computers are thus able to perform efficient bit-serial arithmetic as well as the more traditional fast vector/scalar operations.

11 Claims, 1 Drawing Sheet

APPARATUS FOR PERFORMING A BIT SERIAL ORTHOGONAL TRANSFORMATION INSTRUCTION

BACKGROUND OF THE INVENTION

The present invention relates to vector computers for performing bit transformation to afford efficient access of bits within a word stored in a memory as well as access of the stored words.

The bit serial orthogonal transformation instruction (BSOTI) is a vector instruction which per forms the following function:

$$AB^T \rightarrow C$$

This instruction effectively doubles the instruction set of vector computers. More particularly, BSOTI allows vector machines to operate on individual bits of a word as quickly as they operate on words of information stored in its memory. Thus, vector computers will be able to perform efficient bit-serial arithmetic as well as the more conventional fast vector/scalar operations.

BRIEF DESCRIPTION OF THE PRIOR ART

The levels of speed and performance achieved by conventional supercomputers are made possible through the use of multiple central processing units (CPUs). The increase in the number of CPUs allows these machines to perform many computations at the same time. The simultaneous computing is referred to as parallel computing or parallel processing. Parallel processing devices are well-known in the patented prior art as evidenced by the U.S. patents to Batcher U.S. Pat. No. 3,936,806, U.S. Pat. No. 4,314,349, and U.S. Pat. No. 4,727,474.

Supercomputers carry out parallel processing in various ways, and nomenclature has been developed to categorize these machines. The class of parallel computers referred to as single instruction multiple data (SIMD) computers are identified by a particular architecture in which a single master processor broadcasts the identical instruction to a large number of slave processors. Each slave processor then executes this instruction on data fetched from its own particular local memory.

Several SIMD machines (e.g. CM-2, MPP, and DAP) have been built where the slave processors operate on only one bit. The advantage of using machines with one-bit slave processors is apparent in the areas of graphics and image processing. Furthermore, the ability to operate on an individual bit is necessary for certain iterative numerical computing tasks where the amount of precision needed increases with the number of iterations (as in the field of cryptology). The major disadvantage is that these machines are relatively slow compared to other parallel computers.

Vector computers are another class of parallel processing machines. As used herein, a vector computer or vector machine is a relatively fast vector/scalar processor that treats a vector as a single entity of bits greater than a single word of memory. The instruction set is such that only one instruction is needed to process the entire vector. In many ways, the architecture of a vector machine resembles that of an SIMD machine in that it applies the same instruction to a large number of different data elements. The principle difference between a vector machine and an SIMD machine is the granularity of the operation performed. Most commercial vector machines, for example the Cray 2, have a vector size of 64 words by sixty-four bits per word.

The advantage of vector machines lies in their tremendous speed in processing information. The disadvantage of such machines is that their programs must be "vectorized" or structured in a particular manner so as to take advantage of its features. Therefore, programmers of vector computers must have detailed knowledge of the machine's architecture to effectively utilize these machines for fine grain computation. This leads to significant increases in time expense and effort. Also, vector machines are not efficient in applications where fine granularity is required.

The motivation for the orthogonal transformation instruction is to be able to operate on bits as efficiently as one currently operates on words of information stored in a computer memory. This is a problem because most computers store multiple bits per word, and these bits must be accessed that way for error detection/correction reasons. The major advantage of SIMD computers, in general, is their ability to exploit locality of memory reference and efficiently trade space for time. This is most effective when the bit serial complexity of a computational kernel is small or the data fields involved are small. With the bit serial orthogonal transformation instruction (BSOTI), vector computers will be able to perform efficient bit-serial arithmetic as well as the more traditional fast vector/scalar operations on full word integer and floating point values.

The present invention was developed in order to allow vector computers to operate on bits of information as effectively as SIMD computers, whereby the granularity problem associated with vector computers is overcome. Functionally, the invention works in conjunction with the hardware gather scatter instruction to perform the following bit operations: matrix multiplication, matrix transposition, matrix row/column permutations, compression, and expansion.

SUMMARY OF THE INVENTION

Accordingly, it is a primary object of the present invention to provide a device for performing a bit transformation. The device includes a plurality of input lines for supplying a plurality of bits, respectively, from a word in a first vector register and a plurality of input terminals arranged in a matrix of rows and columns for supplying a plurality of bits from a plurality of words, respectively, in a second vector register. A plurality of AND gates corresponding in number to the number of input terminals are provided, with each AND gate having one input connected with one of the input terminals for controlling the state thereof and the other input connected with one of the bit input lines. All of the AND gates in a row have their other input connected with the same input line for receiving the bit input therefrom. The AND gates of each column have their outputs connected with the input of an OR gate. Thus there is one OR gate for each column of AND gates. Each OR gate has an output providing a transformation function of the bit inputs, whereby efficient access of bits within a word stored in memory is afforded.

According to a more specific object of the invention, the bits on the input lines are associated with the individual bits fetched from a single first memory and the bits on the input terminals are associated with a second memory having words comprising a number of bits corresponding with the square of the number of bits in the first memory.

According to a further object of the invention, the number of input lines corresponds with the number of bits in a word and each bit is supplied to a separate input line. The input lines can be pipelined from individual bits of words from a vector register.

BRIEF DESCRIPTION OF THE FIGURES

Other objects and advantages of the present invention will become apparent from a study of the following specification when viewed in the light of the accompanying drawing, in which.

DETAILED DESCRIPTION

Figure 1:
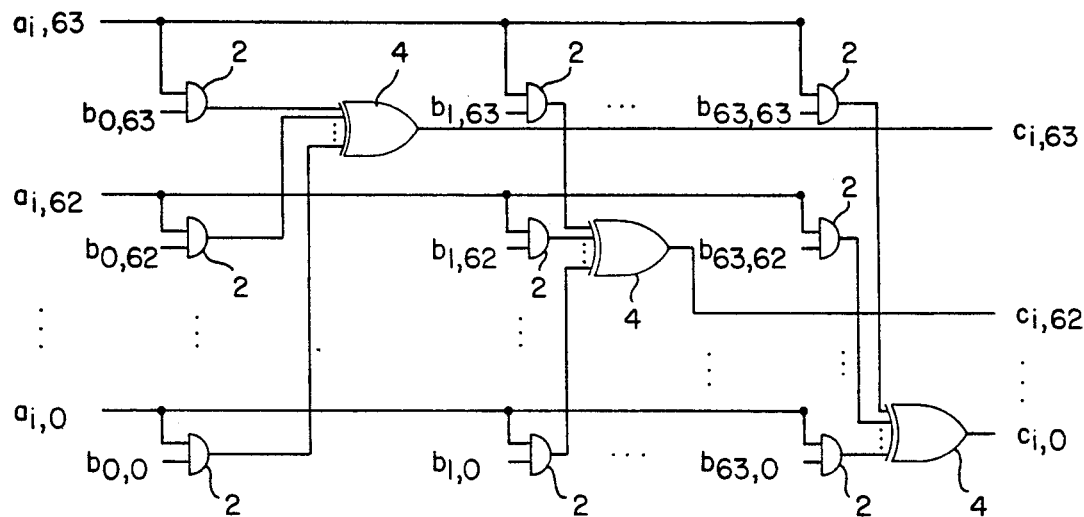
FIG. 1 is a circuit diagram of the bit transformation apparatus according to a preferred embodiment of the invention.

Mathematically, A, B, and C represent binary matrices and $$AB^T$$

represents the binary matrix multiplication of matrix A and matrix B transpose. This multiplication is performed over a field which mathematicians refer to as GF(2).

On a vector computer, A, B, and C are vector registers. For example, on the Cray series of computers, A, B, and C are 64×64 bit matrices organized as 64 words of 64 bits per word. Diagramatically, the mathematical function $$AB^T \rightarrow C$$

can be represented as

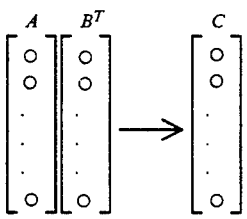

where O represents one 64 bit word of a vector

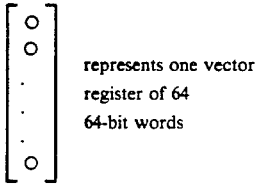

represents one vector register of 64 64-bit words

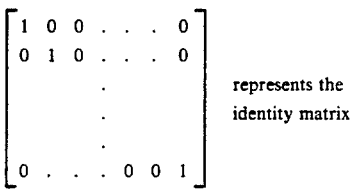

represents the identity matrix $$\begin{bmatrix} 0 & \ldots & 0 & 0 & 1 \\ 0 & \ldots & 0 & 1 & 0 \\ & & \cdot & & \\ & & \cdot & & \\ & & \cdot & & \\ 1 & 0 & 0 & \ldots & 0 \end{bmatrix}$$ represents the reverse identity matrix For certain values of A and B, $AB^T \rightarrow C$ can perform some very important functions including matrix transposition (i.e. "corner turn"), bit reversal, and arbitrary bit permutations.

By way of explanation, matrix transposition is performed as follows. If A represents the identity matrix, then $AB^T \rightarrow C$ perform as a vector register transpose operation mapping bits of B into words of C and words of B into bits of C. This is a very important operation because it allows other instructions that normally operate on words to operate on bits. For example, gather/scatter instructions that allow efficient arbitrary mappings between words now also allow arbitrary mappings between bits. In general, the normal LLOS instruction sequence is mapped into

LTLTOTS where
L is the vector load
S is the vector store
O is the vector operation and
T is the matrix transpose operation For bit reversal functions, let B represent the reverse identity matrix. Then $AB^T \rightarrow C$ performs a bit reversal of the bits of vector register A.

Finally, for arbitrary bit permutations, let B represent an arbitrary permutration matrix (i.e. an arbitrary ordering of the rows of the identify matrix). Then $AB^T \rightarrow C$ performs an arbitrary permutation of the bits of vector register A.

The circuitry for performing the orthogonal transformation instruction $AB^T \rightarrow C$ in accordance with the invention will now be described with reference to FIG. 1. The invention will be described with reference to vector or word sizes of sixty-four bits, although as is apparent to those of ordinary skill in the art, the invention is not limited to such sizes, so long as the word size of the machine equals the vector register size in words.

There are provided a plurality of input lines a. In the drawing, let $a_{ij}$ refer to the jth bit of word i of vector register A. Similarly, let $b_{ij}$ refer to the jth bit of word i of vector register B. The same designations are used for the bits and words of register C (i.e. $c_{ij}$). The words of a vector register are ordered from the first (i=0) to the last (i=63) word and the bits of a vector register are ordered from most significant (j=63) to the least significant (j=0). In addition to the input lines a, there are a plurality of input terminals b. Preferably, the number of input terminals b is the square of the number of input lines a. The input terminals b are arranged in a matrix of rows and columns. Each column corresponds with a word i in register B while each row corresponds with a bit j of the particular word.

The input lines input a bit from a word in vector register A, while each input terminal b inputs a particular bit from a particular word in register B.

A plurality of switching devices 2, preferably AND gates, are arranged in a matrix and have inputs connected with the input lines a and terminals b as shown in FIG. 1. Each AND gate 2 has a pair of inputs. A first input of each AND gate is connected with one of the input terminals b, respectively, for receiving a bit from a word of the second register. These bits control the state of operation of the gate. A second input for each AND gate in a first row of gates is connected with the first input line for receiving a bit from the first register. Similarly, the AND gates of the succeeding rows have second inputs connected with successive input lines, respectively.

A plurality of OR gates 4 are provided in the circuitry according to the invention. The inputs to each OR gate are connected with the outputs of a column of AND gates as shown. Thus there is one OR gate for each column of AND gates. The OR gates have outputs c which contain the bit transformation of the bit inputs from the vector registers A and B via the input lines a and terminals b, respectively.

The transformation circuit of FIG. 1 enables efficient access of the bits within a word stored in a memory as well as access of the words themselves.

In a preferred embodiment, the OR gates comprise "exclusive OR" gates for full realization of the orthogonal transformation instruction. With full realization, all 4K bits of B are first loaded. Then the words of A are pipelined through the circuit into C. The circuit requires 4K AND gates, one for each bit of B, and sixty-four 64-input "exclusive OR" gates.

Partial realization of the orthogonal transformation instruction is realized by substituting "inclusive OR" gates for the more costly "exclusive OR" gates. Such a substitution still provides matrix transposition, bit reversal, and arbitrary bit permutation functions. However, the binary matrix multiplication function would not be possible.

Partial realization of matrix transposition functions may also be realized. If B and C are designated as a pair of vector registers, then they could be wired together such that $b_{ij}$ is directly connected with $c_{ji}$. Then matrix transposition could be performed directly by loading B and accessing C.

Figure 2:
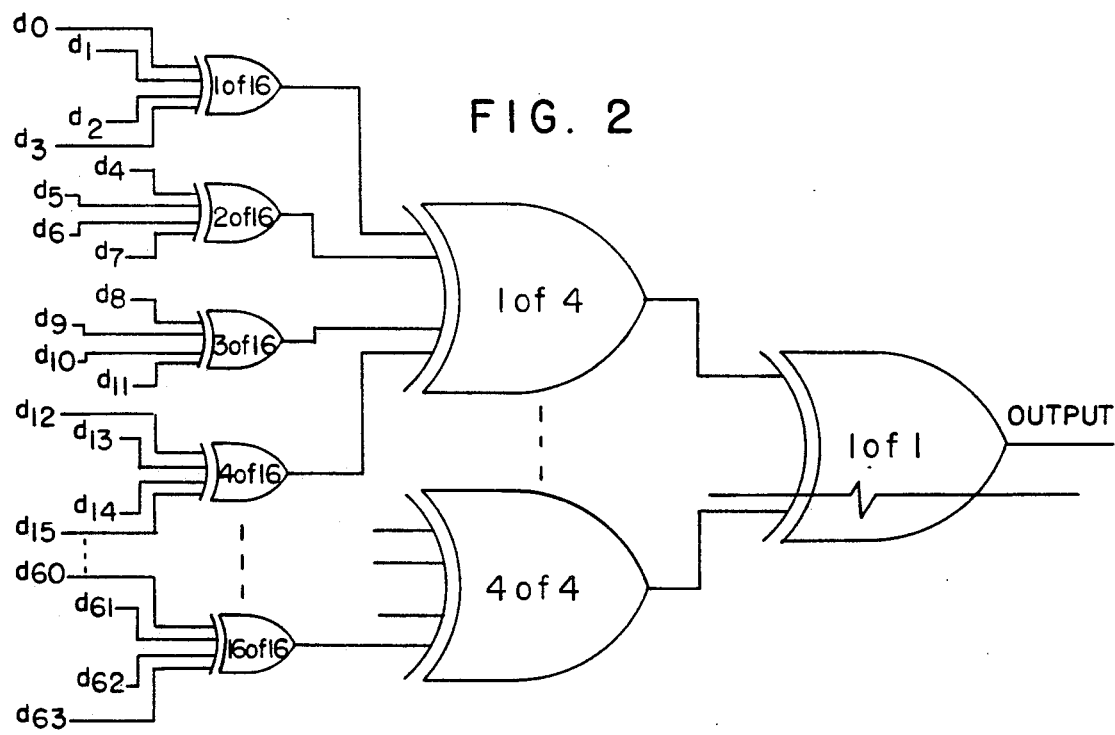
FIG. 2 is a more detailed circuit diagram of a portion of the circuit of FIG. 1.

Referring now to FIG. 2, the actual hardware realization of the 64 input "exclusive OR" or inclusive OR" gates will be described. Let $d_o \ldots d_{63}$ be the inputs. Then the 64 input gate can be realized as a cascade of 21 4-input gates as. All outputs are latched for pipelined operation. For the case of the 64-input "inclusive OR" gate, it may also be possible to construct the gate as one very long transistor with 64 attachments to the gate of the transistor.

The latency through the combining 64-input OR gates 4 can be hidden through pipelining. Thus, one would expect the orthogonal transformation instruction to execute in $64+\Delta$ ticks once the B register is fully loaded which takes another $64+\Delta$ ticks where $\Delta$ is a small number compared to 64. This should be the same basic timing as other vector instructions on typical computers.

Because the B register in $AB^T \rightarrow C$ must be fully loaded before A can be pipelined into C, the inherent latency for matrix transposition (i.e. corner turn) is $128+\Delta$ ticks. However, if a particular machine has at least two OTI functional units and if the total number of transposes desired is greater than or equal to two, then this latency can be partially hidden and in the limit reduced to $64+\Delta'$ ticks using both OTI units. Therefore, it is desirable to have at least two OTI units on a particular machine.

Since both SIMD and vector machines need to provide some kind of error detection/correction on very large memories, accesses to memory must be full word accesses. Therefore, in general the expected performance for single bit indirect fetches will be the same with or without this invention, namely 64 bits for 1 on Cray machines and 32 bits for 1 on a Thinking Machines CM-2.

An example of one type of software for the orthogonal transformation instruction will now be described. In FORTRAN, arrays of 64-bit words are declared as $$\underline{X}(n_1, n_2, \ldots, n_i)$$

where array $\underline{X}$ has i dimensions of $n_1, n_2, \ldots, n_i$.

If in addition to parentheses ( ) for word dimensions, one were to use brackets [ ] for bit dimensions, then the new declaration would look something like $$\underline{X}(n, n_2, \ldots, n_i) [m_1, m_2, \ldots, m_j]$$

where array $\underline{X}$ has i word dimensions of size $n_1, n_2, \ldots, n_i$ and j bit dimensions of size $m_1, m_2, \ldots, m_j$.

With BSOTI, it will now be possible to automatically vectorize both bit and word operations using standard compiler optimization strategies. Granularity issues may limit performance but full vector performance across large $n_i$ or $m_j$ dimensions should always be possible if the corresponding $m_j$ or $n_i$ dimensions, respectively, are held constant. In addition, if the product of $m_j$ dimensions is 64 or less, then the bit permutation operation can be done totally in vector registers, i.e. gather/scatter to memory is not necessary to perform this kind of bit addressing.

Some example codes with expected timings are set forth below:

Let
L be vector load
S be vector store
$L^1$ be random vector load (gather)
$S^1$ be random vector store (scatter) and
O be OTI or $AB^T \rightarrow C$
and assume that all vector operations (other than loading of B for OTI) can be chained one word per tick. Then the following timings for specific codes can be expected.

| FORTRAN Code | Instruction Sequence $AB^T C$ | Timing (ticks) |
|---|---|---|
| DO 1 I = 1, 64 | Setup $L_A$ | $64 + \Delta$ |
| DO 1 J = 1, 64 | Stream $L_B OS_C$ | $128 + \Delta$ |
| 1  Y(I)[J] = X(J)[I] | | |
| DO 1 I = 1, 64 | Setup $L_B$ | $64 + \Delta$ |
| DO 1 J = 1, 64 | Stream $L_A OS_C$ | $64 + \Delta$ |
| 1  Y (I)[J] = X(I)[65-J] | | |
| DO 1 I = 1, 64 | Setup $L'_B$ | $64 + \Delta$ |
| DO 1 J = 1, 64 | Stream $L'_A OS_C$ | $64 + \Delta$ |
| 1  Y (I)[J] = X (Q(I))[R(J)] | | | where Q and R are assumed to be permutations.

While in accordance with the provisions of the patent statue the preferred forms and embodiments have been

What is claimed is:

1. Apparatus for performing a bit transformation, comprising
   (a) a plurality of input lines for supplying a plurality of bits, respectively, from a word in a first vector register;
   (b) a plurality of input terminals arranged in a matrix of rows and columns for supplying a plurality of bits from a plurality of words, respectively in a second vector register;
   (c) a plurality of switching devices arranged in a matrix of rows and columns corresponding with said matrix of second input terminals, each of said switching devices having two inputs and one output, one input of each switching device being connected with one of said input terminals, respectively, for controlling the state of the switching device, the other input of each switching device in a row of switching devices being connected with one of said input lines for receiving the bit input therefrom; and
   (d) a plurality of OR gates each of which is connected with the outputs of one column of said switching devices, each OR gate having an output providing a transformation function of the bit inputs, whereby efficient access of bits within the word stored in a memory and access of the words stored in memory are provided.

2. Apparatus as defined in claim 1, wherein said OR gates comprise exclusive OR gates.

3. Apparatus as define din claim 1, wherein said OR gates comprise inclusive OR gates.

4. Apparatus as defined in claim 1, wherein said switching means comprise AND gates.

5. Apparatus as defined in claim 1, wherein the number of input terminals is the square of the number of input lines.

6. Apparatus as defined in claim 5, wherein the bits on said input lines are the individual bits fetched from a single first memory.

7. Apparatus as defined in claim 6, wherein the bits on said input terminals are from a second memory having words comprising a number of bits corresponding to the square of the number of bits in said first memory.

8. Apparatus as defined in claim 1, wherein said outputs from said OR gates are connected with a computer memory for storing words.

9. Apparatus as defined in claim 1, wherein the number of input lines corresponds with the number of bits in a word, each bit being supplied to a separate input line.

10. Apparatus as defined in claim 9, wherein said input lines are pipelined from individual bits of words from a vector register.

11. Apparatus as defined in claim 9, wherein said outputs from said OR gates are pipelined to individual bits of words of a vector register.

* * * * *